C. G. POLLEYS.
SHOCK ABSORBER.
APPLICATION FILED DEC. 11, 1915. RENEWED NOV. 23, 1916.
1,231,788.                                     Patented July 3, 1917.
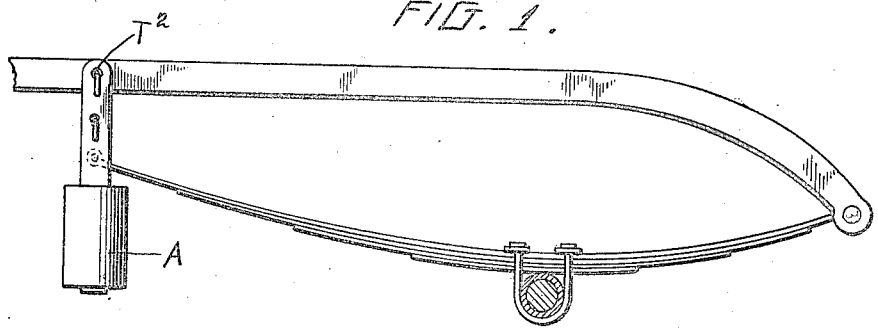
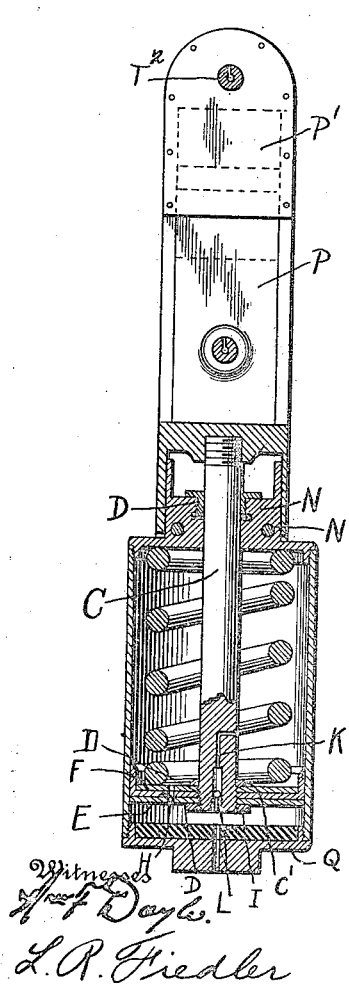
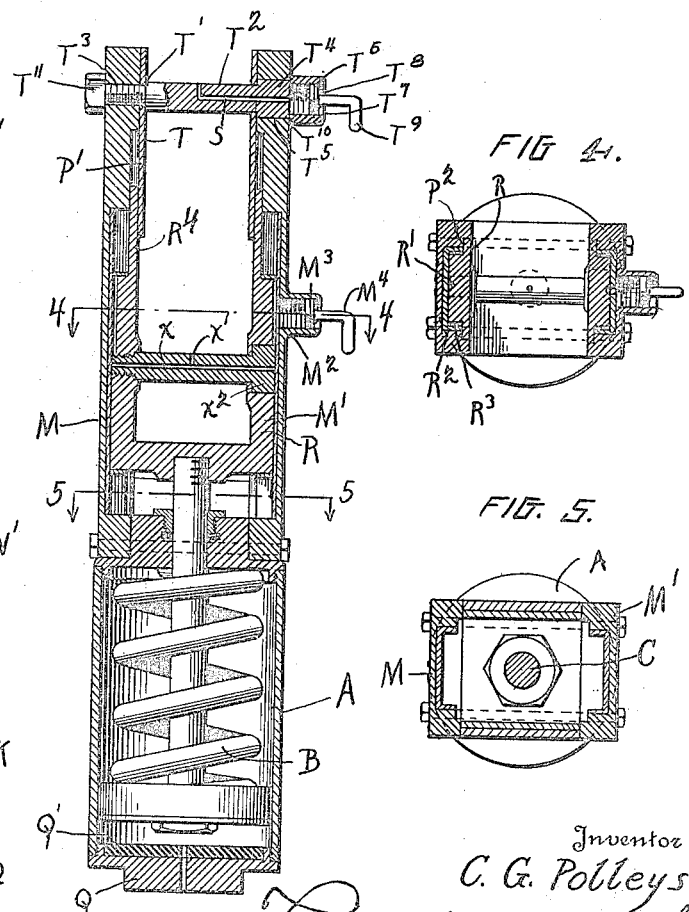
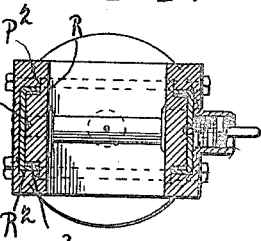
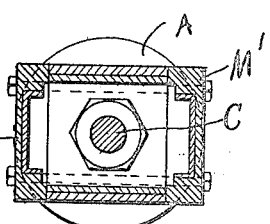
Inventor
C. G. Polleys

UNITED STATES PATENT OFFICE.

CHARLES G. POLLEYS, OF NEWARK, NEW JERSEY.

SHOCK-ABSORBER.

1,231,788.

Specification of Letters Patent.

Patented July 3, 1917.

Application filed December 11, 1915, Serial No. 66,367. Renewed November 23, 1916. Serial No. 133,095.

*To all whom it may concern:*

Be it known that I, CHARLES G. POLLEYS, a citizen of the United States, residing at Newark, in the county of Essex and State of New Jersey, have invented certain new and useful Improvements in Shock-Absorbers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic air cushion shock absorbers and consists in the provision of means for preventing dust and foreign matter from entering the boxing and in the provision of means for lubricating the movable parts.

The invention consists further in the provision of various details of construction, combinations and arrangements of parts which will be hereinafter fully described, shown in the accompanying drawings and then specifically defined in the appended claims.

My invention is illustrated in the accompanying drawings, in which:—

Figure 1 is a side elevation showing the application of my invention to the chassis and spring of a vehicle.

Fig. 2 is a central sectional view through the shock absorber, parts being shown in elevation.

Fig. 3 is a central longitudinal sectional view taken in a plane at right angles to that shown in Fig. 2.

Fig. 4 is a sectional view on line 4—4 of Fig. 3 looking in the direction of the arrow.

Fig. 5 is a sectional view on line 5—5 of Fig. 3 looking in the direction of the arrow.

Reference now being had to the details of the drawings by letter, A designates a cylinder containing the shock absorbing coiled spring B, and C designates a stem which passes through a suitably packed gland D in the upper end of the cylinder and the lower end of the piston is circumferentially threaded as at D' to receive the two metallic disks E and F which are adapted to frictionally clamp a cup washer H, preferably of leather or other suitable material, the circumference of which is adapted to wipe against the inner surface of the cylinder. Said piston is provided with a collar C' engaged by the disk F and a nut I is fitted to the threaded end of the piston and is designed to hold the two disks in clamping relation with said cup packing. Communication is had between the lower portion of the cylinder and the upper portion through a duct K formed in the lower portion of the piston, said duct being provided with a ball valve L which unseats as the piston moves downward, being held to its seat on the upper throw of the piston, causing air in the upper portion of the cylinder intermediate the plunger and the top of the cylinder to be compressed as the spring is put under tension. The lower part of the cylinder is closed by a threaded cap Q engaging circumferential threads in the inner surface of the cylinder, and a buffer Q' is seated upon said cap and serving to cushion the downward throw of the piston.

Fastened to the projecting portion N at the top of the cylinder are the two plates M and M', held to said projection N by means of bolts N' which pass through registering apertures therein and in the plates. The inner face of each of said plates is provided with double recesses, designated respectively by letters P and P', the recesses P being deeper than the recesses P', as shown in Fig. 3, and shoulders, designated by letter $P^2$, are formed in the inner surface of each plate and against which the flanges R of the yoke R' are adapted to bear. A bushing, designated by letter $R^2$, is placed within each recess P. Said bushing has its opposite edges bent and extends the depth of the recess in which it is mounted, slight spaces $R^3$ being left intermediate the flanges or bent sides of the bushing and the adjacent edges of the yoke adapted to contain a lubricant. The upper portion of each arm of the yoke is contracted as at $R^4$ and is adapted to have a reciprocating movement in the recess P'.

Dust excluding and lubricant retaining plates, designated by letter T and shown in section in Fig. 3 of the drawings, are provided with apertures T' to receive the screw $T^2$, which latter engages a threaded opening $T^3$ formed in one of said plates and its other end is provided with a shouldered portion $T^4$ which engages an aperture $T^5$ of similar size formed in the opposite plate. One end of said bolt is chambered as at $T^6$ and having its wall circumferentially threaded as at $T^7$ to receive the threaded plunger T⁸ having a handle T⁹ thereon. It will be noted that a shoulder T¹⁰ is formed at the inner end of the chambered part of said bolt and bears against the face of the adjacent plate when the screw is adjusted in place. A nut T¹¹ is fitted to the threaded end of the bolt and serves as a means for securely holding the same in place. A duct S leads from the chambered portion of the bolt through the circumference thereof and serves as a means whereby a lubricant may be forced through the duct as the threaded plunger is screwed in. It will be understood that the portion of the screw T² intermediate the two plates through which it passes may vary in diameter to adapt the same to different sizes of shackle bolts on springs of vehicles.

A screw, designated by letter X, has a longitudinal duct leading therethrough and also a laterally extending duct X' and the threaded end of the screw engages a threaded aperture formed in the plate R' and its other end is provided with a head X² fitting an aperture formed in the other arm of the yoke.

Upon reference to Fig. 3 of the drawings, it will be noted that a grease cup M² is formed integral with the plate M and has its end wall circumferentially threaded and adapted to receive a threaded plunger M³ having a handle M⁴ for turning the same. It will also be noted that a slight space intervenes between the inner surface of the cylinder and the outer faces of the parts of the yoke which reciprocate therein, sufficient to allow the grease to pass therethrough to thoroughly lubricate all of the moving contact surfaces of the cylinder and yoke. It will be noted upon reference to Fig. 3 that the grease as it is forced through the cup M² will pass through the duct X' in the screw X and thoroughly lubricate the sliding contact faces of the arms of said yokes and recesses in the plates in which said arms reciprocate.

In operation, the parts are assembled as shown in Figs. 2 and 3 of the drawings, the screw T² being connected to the chassis of the vehicle while the shackle bolt of the spring of the vehicle is fastened to the bolt X. On the downward movement of the chassis, the end of the spring connected to the bolt X will move upward and with it the plunger within the cylinder will be drawn up, putting the spring B under tension and also compressing the air intermediate the plunger and the upper end of the cylinder, thus taking up any vibration which would come upon the vehicle. On the return upper movement of the chassis, the spring will expand and throw the piston downward and the valve L will automatically unseat and allow the compressed air within the cylinder to exhaust within the chamber beneath.

What I claim to be new is:—

1. In an automatic air cushion shock absorber, a cylinder, plates secured to a projecting portion thereof, the inner face of each of said plates being provided with double recesses and shoulders, a yoke having flanges adapted to bear against said shoulders, and means for reciprocating said yoke.

2. In an automatic air cushion shock absorber, a cylinder, plates secured to a projecting portion thereof, the inner face of each of said plates being provided with double recesses and shoulders, a yoke having flanges adapted to bear against said shoulders, and means for reciprocating said yoke, one of said recesses being of greater depth than the other, and a bushing within each recess, the upper portion of each arm of the yoke being contracted and mounted to reciprocate in one of said recesses.

In testimony whereof I hereunto affix my signature in presence of two witnesses.

CHARLES G. POLLEYS.

Witnesses:
A. L. HOUGH,
FRANKLIN H. HOUGH.

Copies of this patent may be obtained for five cents each, by addressing the "Commissioner of Patents, Washington, D. C."